United States Patent [19]

Hanajima et al.

[11] 4,167,764
[45] Sep. 11, 1979

[54] MODE CHANGING APPARATUS IN A TAPE RECORDER

[75] Inventors: Mitsuru Hanajima, Houya; Masaru Tezuka; Yasushi Matsumoto, both of Yokohama, all of Japan

[73] Assignee: Sony Corporation, Tokyo, Japan

[21] Appl. No.: 942,164

[22] Filed: Sep. 14, 1978

[30] Foreign Application Priority Data

Sep. 14, 1977 [JP] Japan .................. 52-109989

[51] Int. Cl.² .............. G03B 1/04; G11B 5/54; G11B 15/26
[52] U.S. Cl. .................... 360/90; 226/178; 242/209; 360/105
[58] Field of Search .......... 360/90, 96, 73-74, 360/105, 94; 226/49-50, 186, 178; 242/209, 206, 186

[56] References Cited

U.S. PATENT DOCUMENTS

| | | | |
|---|---|---|---|
| 3,633,920 | 1/1972 | Ban | 360/74 |
| 3,976,263 | 8/1976 | Suzuki | 242/209 X |
| 4,052,742 | 10/1977 | Pastor et al. | 360/96 |

Primary Examiner—John H. Wolff
Attorney, Agent, or Firm—Lewis H. Eslinger; Alvin Sinderbrand

[57] ABSTRACT

In a tape recorder of the type having a first or drive gear rotatable with the capstan by a motor, a second or driven gear rotated by the drive gear when in meshing engagement therewith and having a toothless portion to permit rotation of the drive gear independently of the second gear when the latter is disposed in a rest position with its toothless portion facing the first gear, an actuator in the form of a cam rotatable with the second gear and engaging a lever by which, for example, a head carriage is moved to its operative position for establishing the playback mode of the tape recorder in response to turning of the second gear, and a latching assembly normally holding the second gear in its rest position and being actuable, for example, for selection of the playback mode, to permit angular displacement of the second gear from its rest position into meshing engagement with the first or drive gear so as to be driven by the latter in a substantially complete revolution whereupon the latching assembly agains holds the second gear substantially in its rest position; a drive circuit is selectively operative to drive the motor at two different speeds, and a drive control circuit is operable simultaneously with actuation of the latching assembly to changeover the drive circuit from driving the motor at the higher of the two speeds to driving the motor at the other or slower of the two speeds which, for example, is standard for the playback mode. When the stop mode of the tape recorder is again selected, the drive control circuit again causes the motor to be driven at the higher speed.

10 Claims, 2 Drawing Figures

MODE CHANGING APPARATUS IN A TAPE RECORDER

BACKGROUND OF THE INVENTION

1. Field of the Invention

This invention relates generally to tape recorders, and more particularly is directed to an improved apparatus for changing the operating modes of a tape recorder.

2. Description of the Prior Art

It is known, for example, as disclosed in U.S. Pat. No. 3,976,263, to employ the motor-driven capstan shaft of a tape recorder as the source of the driving force required for establishing a selected mode of operation. In that way, only a relatively small manually applied force need be exerted on a push-button for selecting a respective mode of operation, and the major force for displacement of various elements required in establishing the selected mode is obtained from the capstan shaft. Thus, for example, the motor-driven capstan shaft may be employed as the source of the driving force for moving the magnetic head mounting plate or carriage to its operative position when establishing the playback mode in which the magnetic head or heads engage the tape and the pinch roller is pressed against the rotated capstan with the tape therebetween. In order to obtain such driving force from the motor driven capstan, it has been proposed to rotatably couple a first gear with the motor-driven capstan for rotatably driving a second gear when in meshing engagement with the latter, with the second gear having a toothless portion to permit rotation of the first gear with the capstan independently of the second gear when the latter is disposed in a rest position with its toothless portion facing the first gear. An actuator assembly adapts the tape recorder for a respective function thereof, for example, moves the head mounting plate or carriage to its operative position for establishing the playback mode of the tape recorder, in response to turning of the second gear. A latching assembly normally holds the second gear in its rest position and is actuable, for example, in response to manipulation of a push-button for selecting the playback mode, to permit an angular displacement of the second gear from its rest position into meshing engagement with the first gear so as to be driven by the latter in a substantially complete revolution, whereupon the latching assembly again holds the second gear substantially in its rest position.

With the foregoing arrangement, it is, of course, intended that the second gear should be in its rest position, and thus disconnected from the first gear, at any time when the power supply is first turned on or connected to the capstan driving motor. If such is the case, then the described arrangement for moving the head mounting plate or carriage to its operative position will not impose an excessive load on the motor driving the capstan at the time when the power supply is initially connected to such motor. However, if the power supply is disconnected or turned off shortly after the second gear has been brought into meshing engagement with the first gear, that is, prior to the completion of the movement of the head mounting plate or carriage to its operative position in response to selection of the playback mode, the capstan driving motor may come to rest with the second gear still in meshing engagement with the first gear. In that event, there will be an undesirably high torque loading on the motor when the latter is again connected to the power supply, and such loading may stall the motor.

The foregoing problem can be avoided by continuing the rotation of the capstan and its driving motor for a period of time sufficient to complete substantially a full revolution of the second gear, and thereby return the latter to its rest position disengaged from the first gear, even when the power supply has been disconnected from the capstan drive motor shortly after the second gear has been initially engaged with the first gear. In order to provide for such continued rotation of the capstan drive motor after the power supply has been discontinued therefrom, it has been proposed to increase the inertia of the motor either by increasing the diameter of a flywheel connected therewith or by increasing the rotational speed of the motor. Alternatively, it has been proposed to provide a capacitor in the circuit by which the power supply is connected with the capstan drive motor so that a charge accumulated on the capacitor during operation of the motor will continue to drive the motor for a suitable period of time after the power supply has been disconnected therefrom. However, increasing the size of the flywheel is undesirable in that it increases the cost of the tape recorder and also its size and weight. Providing a capacitor, as aforesaid, is also relatively expensive and space-consuming in that a large capacitance, for example, as large as 10,000 μF, is required. The proposal to increase the speed of rotation of the capstan drive motor is also undesirable in that it requires reduction of the diameter of the capstan to maintain the standard tape speed or recording and reproducing. The capstan of reduced diameter may not have the requisite strength for reliable operation, particularly when subjected to the continuous pressure of the pinch roller.

OBJECTS AND SUMMARY OF THE INVENTION

Accordingly, it is an object of this invention to provide a tape recorder of the described type, that is, in which a motor-driven capstan shaft is employed as the source of a driving force required for establishing a selected mode of operation, and in which the above mentioned problems encountered in existing tape recorders of that type are avoided.

More particularly, it is an object of this invention to provide a tape recorder, as aforesaid, in which gears provided for transmitting a force from the motor-driven capstan for establishing a selected mode of operation, for example, for moving the head mounting plate or carriage to its operative position when the playback mode is selected, are certainly disengaged from each other whenever the power supply for the capstan drive motor is disconnected or turned off.

A further object is to provide a tape recorder, as aforesaid, which can be relatively compact and light in weight as well as inexpensive.

In accordance with an aspect of this invention, in a tape recorder having a first gear rotatably driven by a motor, such as, the capstan drive motor, a second gear adapted to be rotatably driven by the first gear when in meshing engagement therewith and having a toothless portion to permit rotation of the first gear independently of the second gear when the latter is at a rest position with its toothless portion facing the first gear, actuator means adapting the tape recorder for a respective function thereof, for example, establishing the playback mode, in response to turning of the second gear, and which may further urge the second gear to move angularly from its rest position into meshing engagement with the first gear, and latching means normally holding the second gear in its rest position and being actuable to permit the angular movement or displacement of the second gear from its rest position into meshing engagement with the first gear so as to be driven by the latter in a substantially complete revolution whereupon the latching means again holds the second gear substantially in its rest position; there are provided drive circuit means selectively operative to drive the motor at two different speeds, and drive control means operable simultaneously with actuation of said latching means, for example, upon selection of the playback mode, to change-over said drive circuit means from driving the motor at the higher of the two speeds to driving the motor at the other or relatively slower of the two speeds which may be the speed required for the playback mode. Further, when the stop mode of the tape recorder is again selected, the drive control means again causes the drive circuit means to drive the motor at the higher speed.

The above, and other objects, features and advantages of the invention, will be apparent in the following detailed description of illustrative embodiments thereof which is to be read in connection with the accompanying drawings forming a part hereof.

DETAILED DESCRIPTION OF THE PREFERRED EMBODIMENTS

Figure 1:
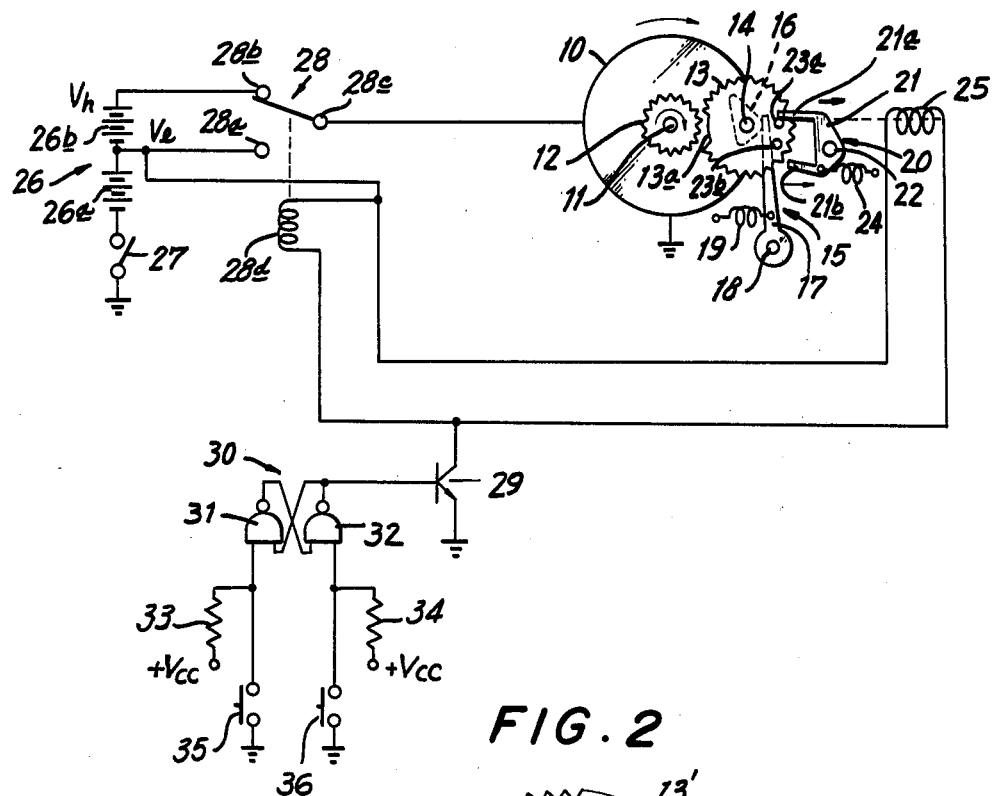
FIG. 1 is a diagrammatic view showing essential mechanical and electrical components of a mode changing apparatus of a tape recorder according to this invention.

Referring first to FIG. 1 of the drawing, it will be seen that, in a tape recorder of the type embodying this invention, a DC motor 10 directly drives a capstan 11 on which a first or drive gear 12 is secured. A second or driven gear 13 is rotatably mounted on a shaft 14 which is located so as to adapt gear 13 to be rotatably driven by gear 12 when in meshing engagement with the latter. The second or driven gear 13 is formed with a toothless portion 13a to permit rotation of gear 12 independently of gear 13 when the latter is disposed in a rest position with its toothless portion 13a facing toward the first or drive gear 12, as shown in FIG. 1. An actuator assembly 15 is provided to adapt the tape recorder for a respective function thereof, for example, to establish the playback mode of operation of the tape recorder, in response to turning of the second or driven gear 13. As shown, the actuator assembly 15 may comprise a cam 16 rotatable with gear 13 about the axis of shaft 14 and a lever member 17 pivotally supported, as at 18, and being urged against cam 16 by a spring 19 so that lever member 17 is rocked to establish the desired mode of operation or function of the tape recorder in response to turning of cam 16 with gear 13.

In order to hold driven or second gear 13 in its illustrated rest position except when it is desired to transmit force from capstan drive motor 10 to actuator assembly 15 for establishing the desired mode or function of the tape recorder, the latter is further shown to include a latch assembly 20 comprised of a latch member 21 which is pivoted or rockable on a pivot pin 22 and which has first and second latch fingers 21a and 21b respectively engageable with first and second latch pins 23a and 23b provided on gear 13 at circumferentially spaced locations. A spring 24 acts on latch member 21 to yieldably urge the latter to the position shown on FIG. 1 in which latch finger 21a extends into the path of latch pin 23a for holding gear 13 in its rest position.

The cam 16 is shaped so that, with gear 13 in its rest position, the force of lever 17 against cam 16 due to spring 19 produces a torque urging gear 13 to turn or be angularly displaced in the counter-clockwise direction, as viewed on FIG. 1, from its rest position into meshing engagement with gear 12. However, latch finger 21a is engageable by latch pin 23a in the direction to oppose such counter-clockwise turning of gear 13 and spring 24 is of sufficient strength to resist the turning of gear 13 by the force of spring 19 acting through lever 17 and cam 16. Thus, so long as latch member 21 is in its normal or spring urged position shown on FIG. 1, the same is effective to prevent turning of gear 13 from its rest position.

When it is desired to employ the force of capstan drive motor 10 for establishing a desired function or mode of the tape recorder, latch member 21 is rocked in the clockwise direction about its pivot 22, for example, by energizing a solenoid 25 having its armature suitably connected with latch member 21, so that latch finger 21a is withdrawn from the path of movement of latch pin 23a with gear 13, and the other latch finger 21b is extended into the path of the latch pin 23b for arresting the rotation of gear 13 in its rest position at the completion of substantially a full revolution. It will be apparent that, in the course of such revolution of gear 13, cam 16 rocks lever 17 in engagement therewith, and such rocking of lever 17 may be employed for establishing the desired function or mode of the tape recorder.

In accordance with the present invention, the tape recorder of FIG. 1 is shown to have a drive circuit 26 which is selectively operative to drive the motor 10 at relatively low and high speeds. In the case where motor 10 is a DC motor, as described above, drive circuit 26 may simply consist of two DC voltage sources or batteries 26a and 26b connected in series with each other and through an ON-OFF or power switch 27 to ground. A drive control circuit of the tape recorder according to this invention is shown to include a relay 28 having a fixed contact 28a connected to a junction point between voltage sources 26a and 26b, a fixed contact 28b connected to the side of voltage source 26b remote from voltage source 28a, and a movable contact 28c connected to DC motor 10 and being selectively engageable with fixed contacts 28a and 28b. It will be appreciated that, when power switch 27 is closed and movable contact 28c of relay 28 is in its normal position shown on FIG. 1, and which corresponds to the deenergized condition of a coil or winding 28d of relay 28, a relatively high voltage $V_h$, that is, the total of the voltages provided by sources 26a and 26b, is applied to DC motor 10 for driving the latter at a relatively high speed. On the other hand, with power switch 27 again being closed and relay coil 28d being energized, as hereinafter described in detail, for moving contact 28c into engagement with contact 28a, a relatively low voltage $V_l$, that is, only the voltage provided by source 26a, is applied to motor 10 for operating the latter at a relatively slow speed which, for example, may correspond to the normal or standard speed at which a magnetic tape is to be driven by capstan 11 during a recording or reproducing operation of the tape recorder.

In the drive control circuit of the tape recorder according to this invention, solenoid 25 and coil 28d of relay 28 are connected in a parallel circuit extending from the junction or connection point between voltage sources 26a and 26b to the collector of a transistor 29 which has its emitter connected to ground. For controlling transistor 29, the base thereof is connected to the output of a flip-flop 30 which, as shown, may be composed of two NAND circuits 31 and 32. First inputs of NAND circuits 31 and 32 are shown to be connected through resistors 33 and 34, respectively, to a suitable voltage source, as indicated at $+V_{cc}$, so as to normally provide a logic "1" at each of the first inputs of NAND circuits 31 and 32. Such first inputs of the NAND circuits 31 and 32 are further adapted to be connected to ground through normally open, mode selecting switches 35 and 36, respectively, which can be manually closed, as by selective manipulation of respective push-buttons, when it is desired to select the stop mode and the playback mode, respectively, of the tape recorder. Further, in flip-flop 30, as shown, second inputs of NAND circuits 31 and 32 are shown to be connected to the outputs of the NAND circuits 32 and 31, respectively, while the output of NAND circuit 32 constitutes the output of flip-flop 30 and is connected to the base of transistor 29 for controlling the condition or state of the latter.

It will be seen that, with switches 35 and 36 both being open, as is usually the case when the operation of the tape recorder is initiated, the output of flip-flop 30 is at the level "0" and, when applied to the base of transistor 29, results in the non-conductive or OFF state of the transistor. If switch 36 is thereafter closed even momentarily, for example, for selecting the playback mode of operation of the tape recorder, the output of flip-flop 30 applied to the base of transistor 29 is at the "1" level so as to obtain the conductive or ON state of the transistor. Thereafter, the output of flip-flop 30 remains at the "1" level for maintaining the ON state of transistor 29 until such time as switch 35 is closed for selecting the stop mode of the tape recorder. Upon closing of switch 35, the output of flip-flop 30 is returned to the "0" level so as to obtain the non-conductive or OFF state of transistor 29. It will be appreciated that solenoid 25 and coil 28d of relay 28 are energized simultaneously from source 26a only when transistor 29 is in its conductive or ON state and power switch 27 is in its closed condition.

The mode changing apparatus for a tape recorder according to this invention, as shown on FIG. 1, operates as follows:

Assuming that switches 35 and 36 initially are open and the output of flip-flop 30 is "0" so that transistor 29 is in its OFF state, then solenoid 25 and relay coil 28d are both deenergized with the result that latch member 21 and the movable contact 28c of relay 28 are in the positions shown on FIG. 1. Upon the closing of ON-OFF or power switch 27, the relatively high voltage $V_h$ from both sources 26a and 26b is applied through relay contacts 28b and 28c to DC motor 10 for rotating the latter at a relatively high speed in the direction indicated by the arrow on FIG. 1. At such time, gear 13 is retained in its illustrated rest position by the engagement of latch finger 21a with latch pin 23a so that gear 12 can rotate independently of gear 13.

Upon actuation or closing of switch 36, for example, for selecting or establishing the playback mode of the tape recorder, the output of NAND circuit 32, and hence of flip-flop 30 is raised to the "1" level so as to turn ON transistor 29 and thereby energize solenoid 25 and coil 28d of relay 28. In response to the energizing of solenoid 25, latch member 21 is rocked against the force of spring 22 for releasing its latch finger 21a from latch pin 23a and thereby permitting the force of spring 19, acting through the engagement of lever 17 with cam 16, to effect angular displacement of gear 13 from its rest position into meshing engagement with gear 12 which is being driven by motor 10. Thereupon, gear 13 is further turned by gear 12 so that cam 16 rocks lever 17 and thereby establishes the desired function, for example, the playback mode, of the tape recorder. As previously noted, after even a momentary closing of switch 36, the output of flip-flop 30 remains at the "1" level so as to maintain transistor 29 in its ON state. Thus, latch member 21 remains in its displaced or rocked position due to the energizing of solenoid 25 with the result that, at the completion of a full revolution of gear 13, latch pin 23b comes against latch finger 21b of latch member 21 for arresting further movement of gear 13 in its rest position.

It will also be appreciated that the energizing of relay coil 28d in response to the turning ON of transistor 29 by the closing of switch 36 causes movable contact 28c of relay 28 to engage fixed contact 28a and thereby apply the relatively low voltage $V_l$ to motor 10. Due to the drag caused by engagement of gear 13 with gear 12 for the transmission of a driving force to lever 17 at the time of the change-over from the high voltage $V_h$ to the low voltage $V_l$ applied to motor 10, the rotational speed of the capstan drive motor 10 is quickly reduced from the high speed to the low speed which, for example, corresponds to the standard tape speed for a playback operation.

It switch 35 is closed to select the stop mode of the tape recording at a time when the latter is in its playback mode of operation, the output of flip-flop 30 is returned to the "0" level so as to turn OFF transistor 29 and thereby deenergize solenoid 25 and relay coil 28d. As a result of the foregoing, latch member 21 returns to its original or illustrated position in which latch finger 21a engages pin 23a for retaining gear 13 in its rest position, and movable contact 28c of relay 28 is returned to its engagement with contact 28b so that the high voltage $V_h$ is again applied to motor 10 for driving the latter at a high speed.

If, with the tape recorder in its stop mode in which motor 10 is rotating at high speed, switch 36 is closed for selecting the playback mode and, immediately after the resulting engagement of gear 13 with gear 12, power switch 27 is opened, the amount of inertia of motor 10 is sufficiently large due to its original high speed rotation to ensure that gears 12 and 13 will continue to rotate until gear 13 returns to its rest position where the toothless portion 13a thereof again faces toward gear 12. Thereafter, if power switch 27 is again closed, gears 12 and 13 are disengaged or free of each other so that motor 10 can start its rotation with only a small starting torque.

Of course, it switch 36 for selecting the playback mode is closed at any time when power switch 27 is open, the resulting turning ON of transistor 29 cannot cause energizing of relay coil 28d or of solenoid 25 as the energizing circuit therefor is open at switch 27. Thus, gear 13 remains locked in its rest position by latch member 21. From the foregoing, it is apparent that no circumstances exist in which motor 10 can be brought to rest or stop with gears 12 and 13 in meshing engagement with each other.

Figure 2:
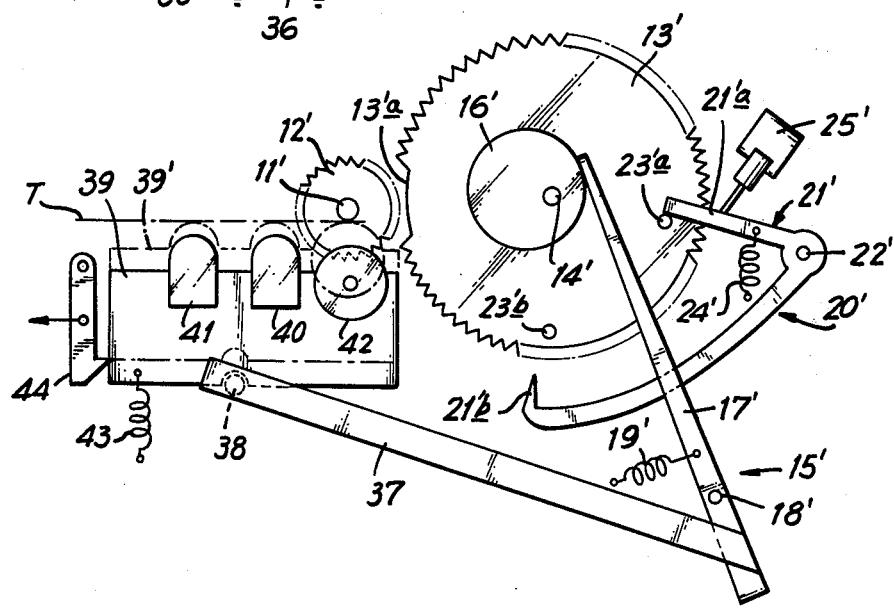
FIG. 2 is an enlarged schematic view of a portion of a mode changing apparatus according to this invention which is employed for moving a head mounting plate or carriage of a tape recorder in establishing the playback mode thereof.

Referring now to FIG. 2 in which elements corresponding to those described above with reference to FIG. 1 are identified by the same reference numearals with primes appended thereto, it will be seen that, when the mode changing apparatus according to this invention is to be employed in connection with the establishment of the playback mode of a tape recorder, the pivoted lever 17' of actuator assembly 15' may have an arm 37 extending rigidly therefrom and carrying a pin 38 which is engageable against a conventional head mounting plate or carriage 39 of the tape recorder. As is usual, the plate or carriage 39 may have mounted thereon a record/playback magnetic head 40, an erasing head 41 and a pinch roller 42 for movement with carriage 39 between an inoperative position shown in full lines on FIG. 2, and an operative position indicated in broken lines at 39'. In the operative position of the head mounting plate or carriage indicated at 39', heads 40 and 41 engage the magnetic tape T, while pinch roller 42 bears against capstan 11' with the tape therebetween for driving the latter at the standard speed for a playback operation. A spring 43 may be connected to plate 39 for urging the latter to return to its inoperative position, while a pivoted locking claw 44 is engageable with plate or carriage 39 in the operative position of the latter for retaining the plate 39 in such operative position against the force of spring 43. As is conventional, claw 44 may be deflected laterally in the direction of the arrow thereon, for example, in response to actuation of a push button which closes switch 35 on FIG. 1 for selecting the stop mode of the tape recorder, whereupon spring 43 is operative to return carriage 39 to its inoperative position.

It will be appreciated that, when gear 13' is moved into meshing engagement with gear 12', for example, in response to closing of switch 36 for selecting the playback mode, cam 16' displaces lever 17' in the clockwise direction about pivot 18' during approximately the first half of the revolution of gear 13', with the result that pin 38 on arm 37 acts against plate 39 for moving the latter to its operative position indicated at 39' and thereby establishing the playback mode of the tape recorder. When plate 39 reaches its operative position, claw 44 becomes effective to retain the head mounting plate at position 39' even though, during the second half of the revolution of gear 13', cam 16' permits spring 19' to move lever 17' in the counter-clockwise position and thereby move pin 38 away from the head mounting plate or carriage. Of course, upon the completion of a revolution of gear 13', further turning of such gear is arrested by the engagement of pin 23b against finger 21b with gear 13' in its rest position, and the playback operation of the tape recorder continues until such time as the stop mode is selected by actuating or closing switch 35 and freeing claw 44 from plate 39 whereupon spring 43 returns head mounting plate 39 to its inoperative position.

It will be appreciated that, since motor 10 driving gear 12 or 12' is rotated at a high speed at the commencement of the movement of head mounting plate 39 to its operative position for establishing a playback mode, the speed of movement of pinch roller 42 to its operative position is increased, with the result that the tape recorder has increased responsiveness to the actuation of the playback mode selecting switch 36. It will also be appreciated that, since motor 10 cannot come to rest with gear 12 in meshing engagement with gear 13, there is no possibility that a large starting torque or load will be imposed on the motor and, therefore, a relatively small motor and a relatively small power supply therefor can be employed. Thus, the tape recorder can be relatively compact and light.

In the schematic showing of FIG. 2, the heads 40 and 41 are illustrated at positions to the left of pinch roller 42 and capstan 11' which rotates in the counter-clockwise direction. Such relative positioning has been adopted merely for ease of illustration, but it will be appreciated that, in practice, the heads 40 and 41 will be relocated so that, when pinch roller 42 engages capstan 11', the cooperative action thereof will pull, rather than push the tape past the magnetic heads.

Although illustrative embodiments of the invention have been described in detail herein with reference to the accompanying drawings, it is to be noted that the invention is not limited to those precise embodiments and that various changes and modifications may be effected therein by one skilled in the art without departing from the scope or spirit of the invention as defined in the appended claims.

What is claimed is:

1. In a tape recorder having a drive motor, a first gear rotatably driven by said motor, a second gear adapted to be rotatably driven by said first gear when in meshing engagement with the latter and having a toothless portion to permit rotation of said first gear independently of said second gear when the latter is disposed in a rest position with said toothless portion facing said first gear, actuator means adapting the tape recorder for a respective function thereof in response to turning of said second gear, means for effecting an angular displacement of said second gear from said rest position into meshing engagement with said first gear, and latching means normally holding said second gear in said rest position and being actuable to permit said angular displacement of the second gear from the rest position into meshing engagement with said first gear so as to be driven by the latter in a substantially complete revolution whereupon said latching means again holds said second gear substantially in said rest position; the combination of drive circuit means selectively operative to drive said motor at two different speeds, power switch means actuable for causing energization of said drive circuit means, and drive control means operable upon actuation of said latching means to change-over said drive circuit means from driving said motor at the higher of said two speeds to driving said motor at the other of said two speeds.

2. A tape recorder according to claim 1; in which said motor is a D.C. motor, said drive circuit means includes means for applying different voltages to said D.C. motor for driving the latter at said two different speeds, respectively, and said drive control means includes switch means by which said different voltages are selectively applied to said motor.

3. A tape recorder according to claim 1; in which said actuator means includes a cam rotatable with said second gear and actuating lever means engaged with said cam to be rocked in response to said revolution of the second gear for establishing said function of the tape recorder; and said means for effecting said angular displacement of the second gear includes spring means urging said actuating lever means against said cam which is shaped so that, in said rest position of the second gear, the urging of said actuating lever means against the cam gives rise to a force acting in the direction of said angular displacement.

4. A tape recorder according to claim 1; in which said latching means includes first and second latch pins on said second gear at circumferentially spaced locations, a rockable latch member having first and second latch fingers and being normally urged to a first position in which said first latch finger extends into the path of said first latch pin for holding said second gear in said rest position, and actuating means for rocking said latch member to a second position in which said first latch finger is withdrawn from said path of the first latch pin and said second latch finger is extended into the path of said second latch pin for arresting said second gear at the end of said substantially complete revolution.

5. A tape recorder according to claim 1; further comprising a capstan also driven by said motor, a carriage movable between inoperative and operative positions, magnetic head means on said carriage engageable with a tape in said operative position of the carriage, and a pinch roller movable against said capstan with the tape therebetween for driving the latter in response to movement of said carriage to said operative position for establishing a playback mode of operation of the tape recorder; and in which said actuator means is engageable with said carriage for moving the latter to said operative position in response to said turning of the second gear.

6. A tape recorder according to claim 1; in which said function of the tape recorder for which the latter is adapted by said actuator means is a playback mode and the tape recorder further has a stop mode; and said latching means includes solenoid means energizeable for actuating the latching means; and said drive control means includes electrically controllable switch means having a de-energized condition in which said motor is driven at said higher speed and an energized condition in which said motor is driven at said other speed, and control circuit means simultaneously energizing said solenoid means and switch means in said playback mode and de-energizing said solenoid means and switch means in said stop mode.

7. A tape recorder according to claim 6; in which said motor is a D.C. motor, and said drive circuit means includes sources of different D.C. voltages made operative in response to actuation of said power switch means and which are selectively applied to said motor by way of said electrically controllable switch means.

8. A tape recorder according to claim 7; in which said control circuit means is also connected with one of said sources of D.C. voltages so that said solenoid means and electrically controllable switch means are energizeable only upon actuation of said power switch means.

9. A tape recorder according to claim 6; in which said control circuit means includes first and second mode selecting switches which are respectively actuable to select said playback mode and said stop mode of the tape recorder, transistor means connected with said solenoid means and said electrically controllable switch means and having an ON state in which said solenoid means and switch means are energized and an OFF state in which said solenoid means and switch means are de-energized, and flip-flop means establishing said ON state in response to actuation of said first mode selecting switch and said OFF state in response to actuation of said second mode selecting switch.

10. A tape recorder according to claim 9; in which said motor is a D.C. motor, said drive circuit means includes sources of different D.C. voltages made operative in response to actuation of said power switch means and which are selectively applied to said motor by way of said electrically controllable switch means, and said control circuit means is also connected with one of said sources of D.C. voltages so that said solenoid means and electrically controllable switch means are energizeable only upon actuation of said power switch means.

* * * * *